United States Patent Office 3,364,003
Patented Jan. 16, 1968

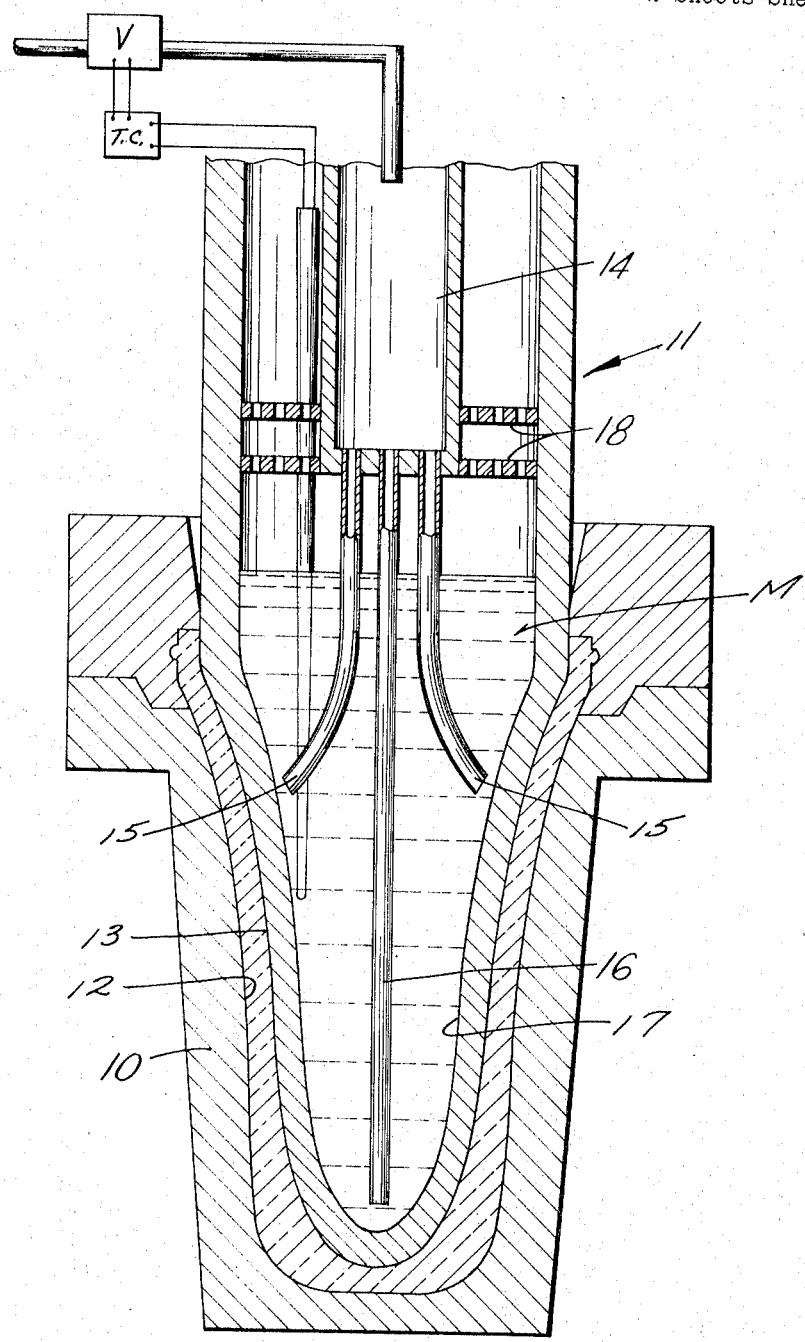

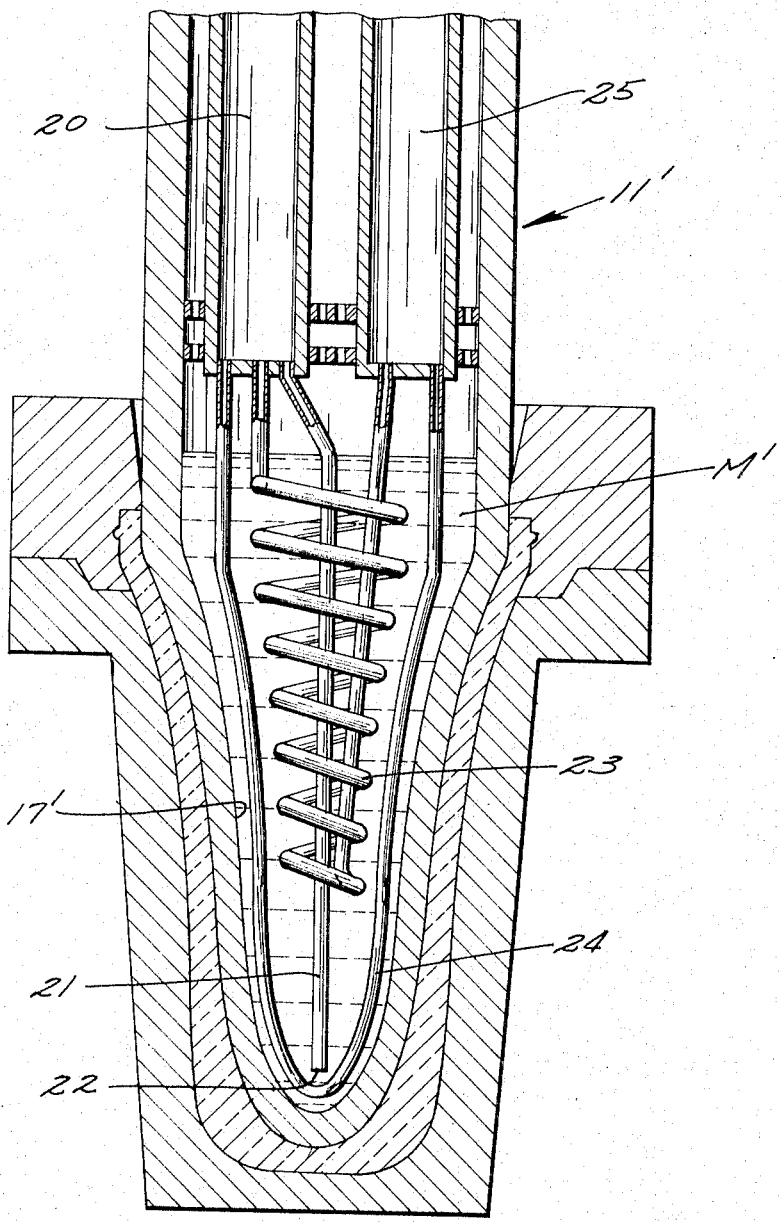

3,364,003
METHOD AND APPARATUS FOR COOLING GLASS PLUNGERS AND MOLDS
Thomas E. Eyles and Julius J. Torok, Toledo, Ohio, assignors to Owens-Illinois, Inc., a corporation of Ohio
Filed May 6, 1964, Ser. No. 365,432
7 Claims. (Cl. 65—83)

ABSTRACT OF THE DISCLOSURE

The method and apparatus described herein is intended for cooling the molding surface against which a charge of molten material is brought to mold the material. A mass of coolant material which is molten at the operating temperatures is placed adjacent the surface of the wall opposite the molding surface and fluid that is a gas at the operating temperatures is introduced into the coolant material to simultaneously cool and agitate the material and cause a circulation of the material. The coolant material may comprise a mixture of sodium nitrate and sodium nitrite and the fluid may comprise water.

This invention is directed to making articles of molten material such as glass and particularly to cooling the molding surfaces which form the glass.

In the making of glass articles, by delivering charges of molten glass to mold and bringing a plunger into position to press the charge, a significant factor limiting the speed of operation is the rate at which heat can be removed from the plunger and mold. The problem of heat removal is complicated by the fact that the heat flux may vary at widely separated points on the molding surfaces because of the shape of the article being molded. If a liquid is used to cool the molding surface, it is difficult to control the heat removal so that it will be different at different points as may be required by the varying heat flux.

It is an object of this invention to provide a method and apparatus for cooling the molding surfaces of a plunger and mold and effectively removing large quantities of heat.

In the drawings:

FIG. 1 is a partly diagrammatic sectional view through a plunger embodying the invention.

FIG. 2 is a diagrammatic part sectional view through a modified form of plunger embodying the invention.

Referring to FIG. 1, charges of molten glass are adapted to be periodically fed to a metal mold 10 by well-known apparatus and a metal plunger 11 is successively brought into contact with the charge to press the charge to a desired shape. In accordance with well-known practice, the molding surface 12 of the mold and the molding surface 13 of the plunger 11 are shaped to the desired configuration.

In accordance with the invention, plunger 11 is hollow and a mass M of a material that is molten at the operating temperatures is provided in the hollow portion of the plunger 11 to a level above the upper edge of the glass article that is to be formed. A liquid cooling medium is provided to an inlet chamber 14 and pipes 15, 16 and flows in fine streams into the mass M preferably adjacent spaced portions of the inside surface 17 of the plunger. The liquid fed through pipes 15, 16 is preferably of the type which will produce a gas at the elevated operating temperatures of the plunger. Formation of the gas in the molten mass M causes agitation of the mass M and facilitates the heat transfer from the surface 17 to the mass M. Thus the gas forming medium that is directed through the tubes 15, 16 serves the dual function of cooling and agitating the mass M.

The rate at which the cooling fluid is supplied is controlled by a valve T which is responsive to a thermocouple submerged in the mass M. The steam formed is vented through vents 18.

The material M should not only be molten at the operating temperatures of the plunger, which is normally from 600 degrees F. to 1,000 degrees F. for glass, but preferably should be molten at temperatures 100 degrees to 200 degrees below the operating temperatures. The material should also be of the type which will readily wet the inside surface 17 of the plunger 11.

Satisfactory results have been achieved by utilizing a 50–50 ratio by weight of sodium nitrate and sodium nitrite as the mass M and water as a cooling medium. Such a mixture of sodium nitrate and sodium nitrite is liquid at the operating temperatures of a glass forming plunger. The water which is directed to the tubes 15, 16 is immediately converted to steam resulting in severe agitation of the salt mixture which moves the heated salt away from the plunger surface 17 so that it will be replaced by more cool salt; the salt between the ends of the tubes 15, 16 and surrounding the tubes being cooled by the passage of the cooling water through the tubes.

It has been found further that the material M should preferably be of the type that will absorb some of the cooling liquid and release it at elevated temperatures. Thus a mixture of salts such as sodium nitrate and sodium nitrite absorbs water, as the cooling medium, and releases it at elevated temperature to produce further steam and further agitation. An apparatus for utilizing this property most effectively is shown in FIG. 2.

Referring to FIG. 2, the plunger 11' has a cavity filled with a mass M' of material that not only is molten at the elevated operating temperatures of the plunger, but in addition will absorb some of the cooling liquid such as water that is introduced into the mass M'. Specifically, water from inlet 20 is directed through a centrally located tube 21 and a small discharge opening 22 in the end of the tube in a fine stream substantially centrally of the mass M'. Additional water is circulated in a helically wound tube 23 and a U extension 24 and returned through outlet 25.

The mass M' not only is cooled by the water circulating through the pipes 23, 24, but also by the water entering the mass M' through orifice 22. In addition, the water entering through orifice 22 becomes steam and causes an agitation of the mass M'. Further the water in the area of the orifice 22 is absorbed by a portion of the mass of material M' adjacent opening 26. This portion of the mass M' is circulated and moves to a position adjacent the hot surface 17'. The added heat causes the water which has been absorbed to be released as steam adjacent surface 17' causing a further agitation.

In practice it has been found that some of the molten material M' adjacent the tubes 23, 24 is deposited or solidifies on the tubes. However, if there is greater concentration of heat at any portion of the outer surface of the plunger 11' or the circulation of the molten material is increased, some of the solidified layer will be melted and heat flow will be increased in that area. Thus there is a regulation of heat flow through both the solidifying of the material on the tubes 23, 24 and the increased convection due to release of the water from the material M' as the material approaches the heated surface 17'.

In practice, it is found that when the plunger of FIG. 2 is filled with a 50–50 mixture by weight of sodium nitrate and sodium nitrite and the cooling liquid is water, a balance can be achieved between the action of agitation by formation of steam through the orifice 22 and by absorption of water and movement of the material toward the surface 17' where the water is released by the salt.

Where the salt material M' is capable of absorbing the liquid, in part, and moves toward the heated surface 17', the absorbed water is driven off creating bubbles that move the normally stagnant film adjacent the surface 17' so that very much larger quantities of heat can be dissipated both by convection of the material M' and by evaporation of the absorbed water in the material.

Although mixtures of sodium nitrate and sodium nitrite have been utilized to produce satisfactory results, other salts such as lithium nitrate or mixtures thereof with sodium nitrate and sodium nitrite may be used, as will be apparent to persons skilled in the art. The material must, of course, be molten at the operating temperatures and compatible with the plunger or mold material. In addition, it should preferably be capable of absorbing some of the cooling liquid and releasing it as it moves nearer the molding surface and is heated, to give the added advantage of further absorption of heat and agitation.

We claim:

1. The method of controlling the temperature of a surface of a molding body comprising
   placing a mass of a mixture of sodium nitrate and sodium nitrite which is molten at the operating temperatures within said body adjacent said molding surface,
   and introducing water in a fine stream into said mass of sodium nitrate and sodium nitrite to agitate said molten mass.

2. The method of controlling the temperature of a surface of a molding body comprising
   placing a mass of a coolant material which is molten at the operating temperatures adjacent the surface of said wall opposite said molding surface,
   introducing a gas forming substance into said mass of coolant material to simultaneously cool and agitate the material and thereby cause circulation of the molten coolant material,
   and removing the gas that is thereby formed.

3. The method set forth in claim 2 wherein said fluid is of the type which can be absorbed by the coolant material and released by said material at the operating temperatures.

4. The method set forth in claim 2 wherein said fluid comprises a liquid at room temperature and is directed into the mass of coolant material in fine streams.

5. The method set forth in claim 2 wherein said coolant material comprises a mixture of sodium nitrate and sodium nitrite and said fluid comprises water.

6. In an apparatus for shaping a mass of molten material such as glass, the combination comprising
   a body having an external molding surface adapted to be contacted by the molten material,
   said body having an internal cooling surface,
   a mass of coolant material which is molten at the operating temperatures positioned adjacent said internal cooling surface and in contact therewith.
   and a plurality of fluid directing means positioned within said body and submerged within said mass adjacent said internal cooling surface for directing a fluid at the operating temperatures into said mass of coolant material.

7. The combination set forth in claim 6 including a tube submerged within said mass of coolant material and having an inlet and an outlet through which a cooling liquid can be circulated.

References Cited

UNITED STATES PATENTS 2,901,865  9/1959  McCormick _____ 65—356

FOREIGN PATENTS 491,846  9/1938  Great Britain.

DONALL H. SYLVESTER, *Primary Examiner.*

A. D. KELLOGG, *Assistant Examiner.*